(12) United States Patent
Nishio et al.

(10) Patent No.: US 11,491,665 B2
(45) Date of Patent: Nov. 8, 2022

(54) TOOL EXCHANGE DEVICE

(71) Applicant: NITTA CORPORATION, Osaka (JP)

(72) Inventors: Hideki Nishio, Nabari (JP); Yasushi Kamada, Osaka (JP)

(73) Assignee: NITTA CORPORATION, Osaka (JP)

( * ) Notice: Subject to any disclaimer, the term of this patent is extended or adjusted under 35 U.S.C. 154(b) by 898 days.

(21) Appl. No.: 16/332,874

(22) PCT Filed: Sep. 7, 2017

(86) PCT No.: PCT/JP2017/032243
§ 371 (c)(1),
(2) Date: Mar. 13, 2019

(87) PCT Pub. No.: WO2018/056061
PCT Pub. Date: Mar. 29, 2018

(65) Prior Publication Data
US 2019/0358830 A1    Nov. 28, 2019

(30) Foreign Application Priority Data
Sep. 23, 2016    (JP) .............................. JP2016-186145

(51) Int. Cl.
*B25J 15/04*    (2006.01)
*B25J 18/00*    (2006.01)

(52) U.S. Cl.
CPC ............ *B25J 15/0425* (2013.01); *B25J 18/00* (2013.01)

(58) Field of Classification Search
CPC . B25J 15/0425; B25J 15/0033; B25J 15/0038
USPC ......................................................... 294/213
See application file for complete search history.

(56) References Cited

U.S. PATENT DOCUMENTS

| | | | | |
|---|---|---|---|---|
| 4,145,128 A | * | 3/1979 | Lange ..................... | G03B 7/003 396/209 |
| 4,549,846 A | * | 10/1985 | Torii ........................ | B25J 15/04 24/607 |
| 4,636,135 A | * | 1/1987 | Bancon ................ | B25J 15/0491 483/901 |
| 4,664,588 A | * | 5/1987 | Newell ................ | B23Q 1/0063 414/730 |
| 4,815,780 A | * | 3/1989 | Obrist ...................... | B25J 15/04 294/86.4 |

(Continued)

FOREIGN PATENT DOCUMENTS

| | | |
|---|---|---|
| JP | H04360783 A | 12/1992 |
| JP | H0592383 A | 4/1993 |

(Continued)

*Primary Examiner* — Paul T Chin
(74) *Attorney, Agent, or Firm* — Muncy, Geissler, Olds & Lowe, P.C.

(57) ABSTRACT

A tool exchange device includes a male member and a female member. The male member is attached to a side of a main body of an apparatus. The female member is attached to a side of a tool. The male member and the female member includes a plurality of coupling portions mechanically connected to each other, and a connector portion that connects a power supply path arranged in the main body and the tool to each other. The plurality of coupling portions and the connector portion are provided in each of joining surfaces of the male member and the female member. The plurality of coupling portions are arranged around the connector portion.

3 Claims, 3 Drawing Sheets

(56) References Cited

U.S. PATENT DOCUMENTS

| | | | | |
|---|---|---|---|---|
| 6,491,612 | B1* | 12/2002 | Kurup | .................... B23K 9/206 |
| | | | | 483/69 |
| 9,975,253 | B2* | 5/2018 | De Castelbajac | .... B25J 15/0475 |
| 10,076,844 | B2* | 9/2018 | Rizk | .................... B25J 15/0491 |
| 2013/0012053 | A1 | 1/2013 | Sirkett et al. | |
| 2020/0108497 | A1* | 4/2020 | Miyazaki | ............. B25J 15/0425 |

FOREIGN PATENT DOCUMENTS

| | | |
|---|---|---|
| JP | H08111256 A | 4/1996 |
| JP | 2012250327 A | 12/2012 |

* cited by examiner

TOOL EXCHANGE DEVICE

TECHNICAL FIELD

The present invention relates to a tool exchange device.

BACKGROUND ART

As a tool exchange device applied to various apparatuses such as an industrial robot, a tool exchange device including a male member to be attached to the robot side, and a female member to be attached to the tool side is disclosed (for example, Patent Literature 1). The male member and the female member are coupled to and separated from each other by a coupling portion provided in the center. In the male member, a first coupling portion including a protruding portion and a cam capable of radially protruding from the protruding portion is provided to a male main body. In the female member, a second coupling portion including a coupling hole in which the protruding portion is insertable and an engaging part, which is provided on the inner circumferential surface of the coupling hole and with which the cam is engaged, is provided on a female main body. In the tool exchange device, the male member and the female member are coupled to each other when the cam is engaged with the engaging part in a state in which the protruding portion is inserted in the coupling hole. Further, the male member and the female member may be separated from each other by releasing the engagement between the cam and the engaging part. As described above, the tool exchange device can exchange the tool attached to the industrial robot.

The tool exchange device includes a connector portion that connects and disconnects a signal line in conjunction with the coupling and separation of the male member and the female member. The connector portion includes a first connector portion arranged on the outside of the male main body, and a second connector portion arranged on the outside of the female main body. The first connector portion includes a robot-side connector and a first relay connector. A cable pulled out from the robot side is connected to the robot-side connector of the male member. The second connector portion includes a tool-side connector and a second relay connector. The tool-side connector is connected to a servo module of the tool via a cable serving as a power supply path. By connecting the first relay connector and the second relay connector to each other, the robot and the tool are electrically connected to each other.

CITATION LIST

Patent Literature

Patent Literature 1: Japanese Patent Laid-Open No. 2012-250327

SUMMARY OF INVENTION

Technical Problem

In recent years, a robot in which a cable is arranged in the robot is becoming used in order to prevent interference with other apparatuses and workpieces. In a tool exchange device, a connector portion is arranged on the outside of a male main body and a female main body, and hence there is a need to pull out the cable arranged in the robot to the outside at a distal end of the robot and connect the cable to the connector portion. Therefore, there has been a problem that the cable restricts the operation of the robot. Further, the tool exchange device requires a space for pulling out the cable between the distal end of the robot and the male member, thereby causing not only downsizing to be difficult but also the moment generated on the robot to be increased. Therefore, there has been a problem that the rated power output of the robot cannot be obtained.

An object of the present invention is to provide a tool exchange device capable of performing coupling of a power supply path arranged in a robot without pulling out the power supply path to the outside.

Solution to Problem

A tool exchange device according to the present invention includes: a male member to be attached to a side of a main body of an apparatus; and a female member to be attached to a side of a tool. In the tool exchange device, the male member and the female member include: a plurality of coupling portions mechanically connected to each other; and a connector portion that connects a power supply path arranged in the main body and the tool to each other, the plurality of coupling portions and the connector portion are provided in each of joining surfaces of the male member and the female member, and the plurality of coupling portions are arranged around the connector portion.

Advantageous Effects of Invention

According to the present invention, the connector portion is provided in each of joining surfaces of the male member and the female member, and the power supply path such as a cable and a tube is not exposed to the outside of the main body. The tool exchange device does not require a space for pulling out the power supply path between the distal end of the apparatus and the male member, and can be easily downsized.

DESCRIPTION OF EMBODIMENT

An embodiment of the present invention is described in detail below with reference to the drawings.

Figure 1:
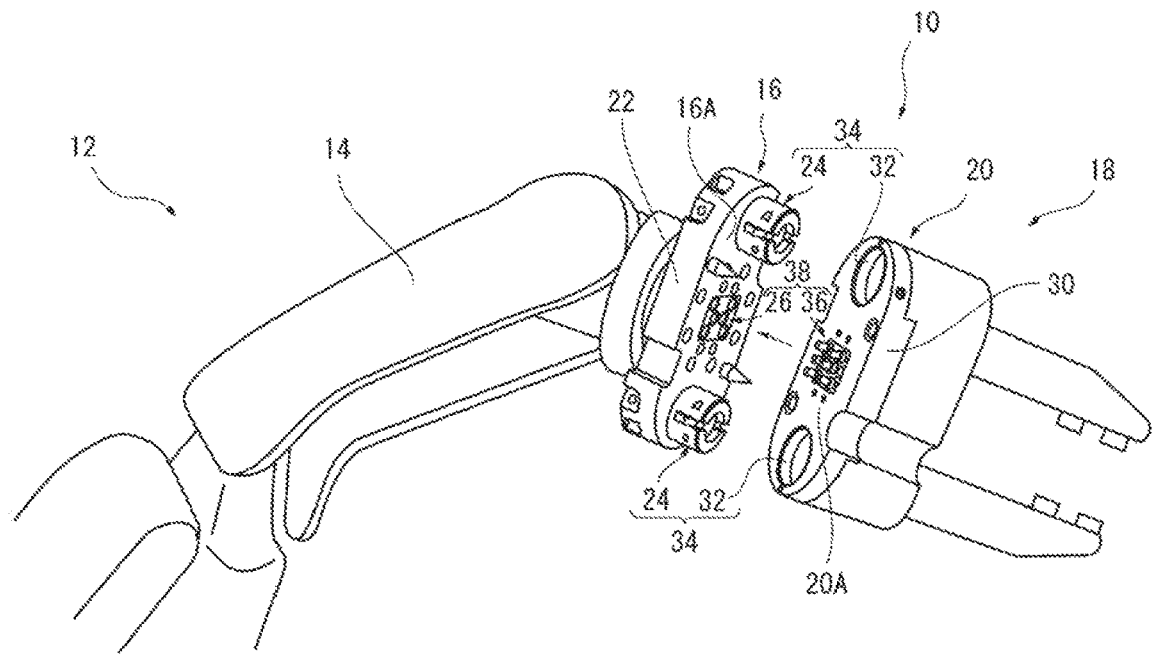
FIG. 1 is a perspective view illustrating a state in which a tool exchange device according to this embodiment is used.

A tool exchange device 10 illustrated in FIG. 1 includes a male member 16 fixed to a distal end of the arm 14 as a main body of the industrial robot 12, and a female member 20 fixed to a tool 18. The male member 16 is removably fixed to the arm 14 by a fastener (not shown) in a state in which a fixing surface (not shown in this figure) is in contact with the arm 14. The female member 20 is removably fixed to the tool 18 by a fastener (not shown) in a state in which a fixing surface (not shown in this figure) is in contact with the tool 18. A bolt may be used as the fastener, for example.

The tool 18 is not particularly limited, and a manipulator, a deburring tool, a handling jig, a spot welding gun, and the like can be applied, for example. A plurality of different types of the tools 18 are provided for one arm 14 in a state in which the female member 20 is attached. The arm 14 and the tool 18 can be coupled to and separated from each other via the tool exchange device 10, and the tool 18 is exchangeable. A control unit (not shown) is connected to the male member 16, and the coupling and separation of the male member 16 and the female member 20 are controlled by the control unit.

The tool exchange device 10 includes connector portions 38 in joining surfaces 16A and 20A, and electrically connect the robot and the tool 18 to each other via the connector portions 38. The connector portions 38 include a first connector portion 26 and a second connector portion 36. In the male member 16, the first connector portion 26 is attached to the center of the joining surface 16A. Although not shown, the first connector portion 26 includes a robot-side connector arranged on a fixing surface 16B side, and a first relay connector arranged on the joining surface 16A side. A cable serving as a power supply path arranged in the arm 14 is connected to the robot-side connector on the fixing surface 16B side of the male member 16. Although not shown, the second connector portion 36 includes a tool-side connector arranged on a fixing surface 20B side, and a second relay connector arranged on a joining surface 20A side. The tool-side connector is connected to a servo module of the tool 18 via a cable serving as a power supply path on the tool side.

In the first connector portion 26 and the second connector portion 36, the first relay connector and the second relay connector are connected to each other in accordance with the coupling of the male member 16 and the female member 20. As a result, a power supply device (not shown) serving as the motivity and the abovementioned control unit are electrically connected to a servo motor portion of the tool 18. By the electrical connection, for example, various circuit signals for controlling a servo motor are exchanged between a control device and the servo motor portion, and electric power is supplied to the servo motor from the power supply device.

The tool exchange device 10 includes a plurality of coupling portions 34 around the connector portions 38, and the robot and the tool 18 are mechanically connected to each other via the coupling portions 34. The coupling portion 34 includes a first coupling portion 24 and a second coupling portion 32. In the male member 16, a plurality of (two in this figure) first coupling portions 24 are provided around the first connector portion 26. In the female member 20, the same number of (two in this figure) second coupling portions 32 as the first coupling portions 24 are provided around the second connector portion 36.

When the tool 18 and the arm 14 are coupled to each other, the male member 16 and the female member 20 are fixed to each other by moving the arm 14 and operating an engaging mechanism formed by a cam and the like in a state in which the joining surface 16A and the joining surface 20A are in contact with each other and the first coupling portion 24 is inserted in the second coupling portion 32. When the tool 18 and the arm 14 are separated from each other, the male member 16 and the female member 20 are separated from each other by moving the arm 14 in a direction in which the male member 16 is separated from the female member 20 after the fixing by the engaging mechanism is released.

Figure 2:
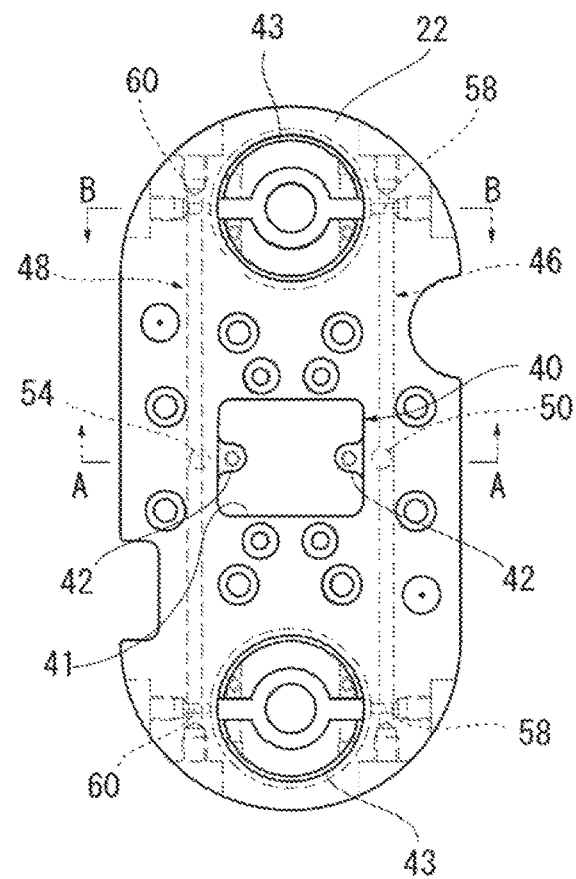
FIG. 2 is a plan view of a male main body.
Figure 3:
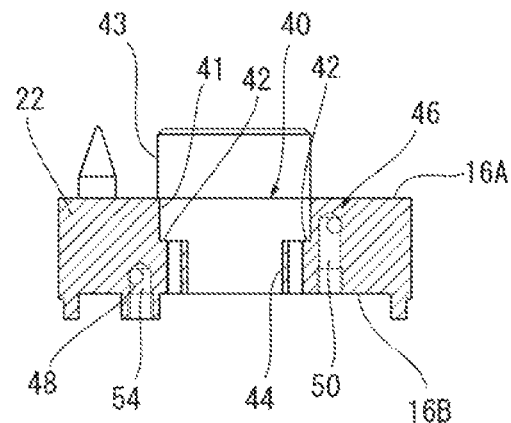
FIG. 3 is a cross-sectional view taken along line A-A in FIG. 2.

As illustrated in FIG. 2 and FIG. 3, the male member 16 includes a plate-like male main body 22. The male main body 22 includes a first connector setting portion 40 provided in the center, and protruding portions 43 provided on both sides so as to sandwich the first connector setting portion 40. The first connector setting portion 40 includes a rectangular-shaped hole 41 passing through the male main body 22 in the thickness direction thereof, and first setting tables 42. The first setting tables 42 support the bottom surface of the first connector portion 26 inserted from the joining surface 16A side. In the first connector portion 26 set on the first setting tables 42, the first relay connector is exposed to the joining surface 16A side, and the robot-side connector is exposed to the fixing surface 16B side.

In this figure, the first setting tables 42 are two protrusions formed on inner surfaces of the hole 41 opposed to each other and protruding to inner sides with respect to the inner surfaces. The first setting tables 42 have upper ends provided on approximately the center of the male main body 22 in the thickness direction thereof, and lower ends that are the same as the fixing surface 16B. Female screws are formed in the first setting tables 42, and bolts (not shown) for fixing the first connector portion 26 are screwed in from the joining surface 16A side. A through hole 44 is formed in the first connector setting portion 40 on the fixing surface 16B side thereof. The cable is connected to the robot-side connector through the through hole 44.

The male main body 22 includes a first gas introduction inlet 50 and a second gas introduction inlet 54 opened to the fixing surface 16B side as gas introduction inlets. The first gas introduction inlet 50 is connected to a first distribution channel 46. The first distribution channel 46 is a through hole formed between the joining surface 16A and the fixing surface 16B of the male main body 22 and passing in the surface direction. The first distribution channel 46 is connected to first gas supply/exhaust ports 58 provided to the two protruding portions 43. The second gas introduction inlet 54 is connected to a second distribution channel 48. The second distribution channel 48 is a through hole formed between the joining surface 16A and the fixing surface 16B of the male main body 22 and passing in the surface direction. The second distribution channel 48 is connected to second gas supply/exhaust ports 60 provided to the two protruding portions 43.

Figure 4:
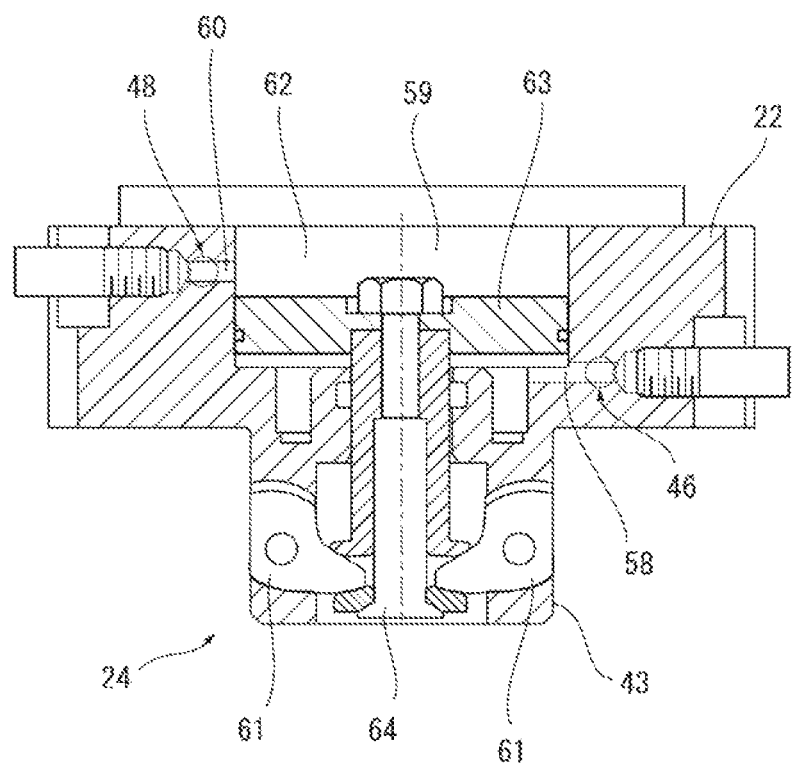
FIG. 4 is an enlarged cross-sectional view of a male member taken along line B-B in FIG. 2.

As illustrated in FIG. 4, the male member 16 includes a cylinder portion 59 and a cam 61 as the engaging mechanism. The cylinder portion 59 is an air cylinder including a cylinder chamber 62, a piston 63 accommodated in the cylinder chamber 62, and a piston rod 64 coupled to the piston 63, and the cam 61 is rotationally moved by linearly moving the piston rod 64.

The piston 63 has a cylindrical shape, and is movable in the axial direction (the vertical direction in this figure) thereof. The piston 63 reciprocates in accordance with the pressure of the gas (hereinafter referred to as "air pressure"). The position of the piston 63 illustrated in this figure is a position in which the cam 61 is moved to a release position in which the engagement with the second coupling portion 32 is released. By moving the piston 63 in the upper direction in this figure, the cam 61 moves to an engagement position that engages with the second coupling portion 32.

In the cylinder chamber 62, the first gas supply/exhaust port 58 and the second gas supply/exhaust port 60 passing through a side wall are provided. The first gas supply/exhaust port 58 is opened in a place below the piston 63 in the release position in the cylinder chamber 62. The second gas supply/exhaust port 60 is opened in a place above the engagement position of the piston 63 in the cylinder chamber 62.

The piston 63 is moved to the release position or the engagement position by feeding gas into the cylinder chamber 62 via one of the first gas supply/exhaust port 58 from the first gas introduction inlet 50 through the first distribution channel 46 and the second gas supply/exhaust port 60 from the second gas introduction inlet 54 through the second distribution channel 48, and exhausting gas to the outside of the cylinder chamber 62 via the other of the first gas supply/exhaust port 58 and the second gas supply/exhaust port 60. Note that, although not shown, a coil spring that biases the piston 63 toward the engagement position is provided, and the piston 63 is moved against the biasing force of the coil spring by air pressure when the piston 63 is moved to the release position.

Figure 5:
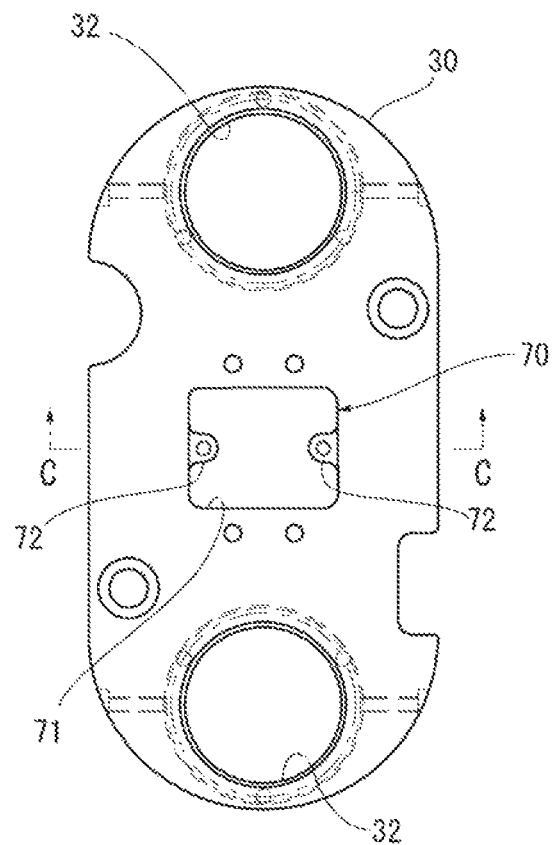
FIG. 5 is a plan view of a female main body.
Figure 6:
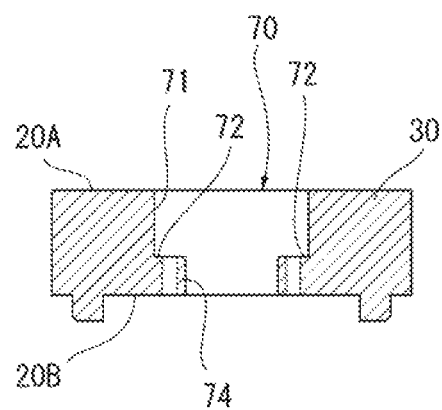
FIG. 6 is a cross-sectional view taken along line C-C in FIG. 5.

As illustrated in FIG. 5 and FIG. 6, the female member includes a plate-like female main body 30. The female main body 30 includes a second connector setting portion 70 in the center. The second connector setting portion 70 includes a hole 71 passing through the female main body 30 in the thickness direction thereof, and second setting tables 72. The second setting tables 72 support the bottom surface of the second connector portion 36 inserted from the joining surface 20A side. In the second connector portion 36 set on the second setting tables 72, the second relay connector is exposed to the joining surface 20A side, and the tool-side connector is exposed to the fixing surface 20B side.

In this figure, the second setting tables 72 are two protrusions formed on inner surfaces of the hole 71 opposed to each other and protruding to inner sides with respect to the inner surfaces. The second setting tables 72 have upper ends provided on approximately the center of the female main body 30 in the thickness direction thereof, and lower ends that are the same as the fixing surface 20B. Female screws are formed in the second setting tables 72, and bolts (not shown) for fixing the second connector portion 36 are screwed in from the joining surface 20A side. A through hole 74 is formed in the second connector setting portion 70 on the fixing surface 20B side thereof. The cable connected to the tool-side connector is connected to the servo motor portion through the through hole 74.

The male member 16 according to this embodiment can connect the cable arranged in the arm 14 to the first connector portion 26 provided in the center of the joining surface 16A at the distal end of the arm 14. Therefore, the tool exchange device 10 can couple the cable arranged in the arm 14 with the first connector portion 26 without pulling out the cable to the outside of the arm 14.

The tool exchange device 10 does not restrict the operation of the industrial robot 12 by the cable because the cable is not exposed to the outside of the arm 14. In addition, the tool exchange device 10 does not require a space for pulling out the cable between the distal end of the industrial robot 12 and the male member 16, can be easily downsized, and can prevent unnecessary moment from being generated on the industrial robot 12. Therefore, the rated power output of the industrial robot 12 can be obtained.

The male main body 22 includes the first distribution channel 46 and the second distribution channel 48 that distribute compressed gas supplied to the first gas introduction inlet 50 and the second gas introduction inlet 54 to the two coupling portions 34, and hence the tool exchange device 10 can operate a plurality of the coupling portions 34 at the same timing.

The male main body 22 and the female main body 30 include the first connector setting portion 40 and the second connector setting portion 70 to which the first connector portion 26 and the second connector portion 36 can be attached from the side of the joining surfaces 16A and 20A. As a result, when the cable is changed, the first connector portion 26 and the second connector portion 36 can be removed without removing the male member 16 from the arm 14 and removing the female member 20 from the tool 18, and hence the ease of maintenance can be enhanced.

Modified Example

The present invention is not limited to the abovementioned embodiment, and can be modified within the scope of the present invention, as appropriate.

In the abovementioned embodiment, a case where the number of the coupling portions 34 is two has been described, but the number may be three or more.

In the abovementioned embodiment, a case where the connector portions 38 are electrically connected with use of the power supply serving as the motivity and the cable serving as the power supply path has been described, but the present invention is not limited thereto. For example, a pump that pumps fluid such as water and gas may be used as the motivity. In this case, tubes can be used as the power supply path and the tool-side power supply path, and a pipe joint can be used as the connector portion.

A case where the tool exchange device 10 includes the connector portion 38 in the center of the joining surface has been described, but the tool exchange device 10 may include a plurality of the connector portions 38 provided in a symmetrical manner so as to sandwich the center of the joining surface.

REFERENCE SIGNS LIST

10 tool exchange device
12 industrial robot (apparatus)
14 arm (main body)
16 male member
16A, 20A joining surface
18 tool
20 female member
34 coupling portion
38 connector portion
46 first distribution channel
48 second distribution channel
50 first gas introduction inlet
54 second gas introduction inlet

The invention claimed is:
1. A tool exchange device, comprising:
a male member to be attached to a side of a main body of an apparatus; and
a female member to be attached to a side of a tool, wherein:
the male member and the female member comprise:
a plurality of coupling portions mechanically connected to each other; and
a connector portion that connects a power supply path arranged in the main body and the tool to each other;
the plurality of coupling portions and the connector portion are provided in each of joining surfaces of the male member and the female member;
the plurality of coupling portions are arranged around the connector portion, the connector portion includes a first connector portion and a second connector portion, the male member includes a male main body, the male main body including a first connector setting portion provided in a center of the male main body, the first connector setting portion includes a hole passing through the male main body in a thickness direction thereof, and a first setting table to support a bottom surface of the first connector portion inserted from a joining surface side of the male member, the female member includes a female main body, the female main body including a second connector setting portion provided in a center of the female main body, and the second connector setting portion includes a hole passing through the female main body in a thickness direction thereof, and a second setting table to support a bottom surface of the second connector portion inserted from a joining surface side of the female member.

2. The tool exchange device according to claim 1, wherein in a state in which the male member is separated from the female member after a connection among the plurality of coupling portions is released, the first connector portion attached to the first connector setting portion is removable from the joining surface side of the male member, and the second connector portion attached to the second connector setting portion is removable from the joining surface side of the female member.

3. The tool exchange device according to claim 1, wherein the male member comprises:

a gas introduction inlet opened in a fixing surface to be fixed to the main body; and a distribution channel configured to distributes compressed gas supplied to the gas introduction inlet to the plurality of coupling portions.

* * * * *